United States Patent [19]
Herman et al.

[11] 3,900,280
[45] Aug. 19, 1975

[54] APPARATUS FOR STRETCHING A TUBULAR WORK PIECE

[75] Inventors: Eugene T. Herman, St. Marys; Kenneth W. McIntosh, Cuyahoga Falls, both of Ohio

[73] Assignee: The Goodyear Tire & Rubber Company, Akron, Ohio

[22] Filed: Jan. 28, 1974

[21] Appl. No.: 437,111

[52] U.S. Cl. .................... 425/392; 26/54; 264/291; 425/445; 425/451.9
[51] Int. Cl.² ........................................ B29C 17/02
[58] Field of Search...425/392, 445, 405 C, DIG. 53, 425/451.9; 26/55 R, 54, 26/54 A; 264/291

[56] References Cited
UNITED STATES PATENTS

| | | | |
|---|---|---|---|
| 2,515,830 | 7/1950 | Mahler | 26/54 |
| 2,532,862 | 12/1950 | Snyder | 425/392 |
| 2,759,217 | 8/1956 | Peterson | 264/291 X |
| 2,856,634 | 10/1958 | Ames | 264/291 X |
| 2,912,716 | 11/1959 | Frownfelter et al. | 26/54 A |
| 3,182,355 | 5/1965 | Arnaudin, Jr. | 425/392 X |

*Primary Examiner*—Robert L. Spicer, Jr.
*Attorney, Agent, or Firm*—F. W. Brunner; R. P. Yaist

[57] ABSTRACT

An apparatus for stretching or expanding a flexible resilient tubular work piece in at least two non-parallel directions. The apparatus includes frame members mounted for movement of at least one frame member toward and away from the other frame member and pivotably movable means for gripping the work piece so that the desired stretching occurs when the frame members move in one axial direction in relation to each other. The invention is particularly useful as an expanding device for providing a cover over spliced electrical cable.

11 Claims, 10 Drawing Figures

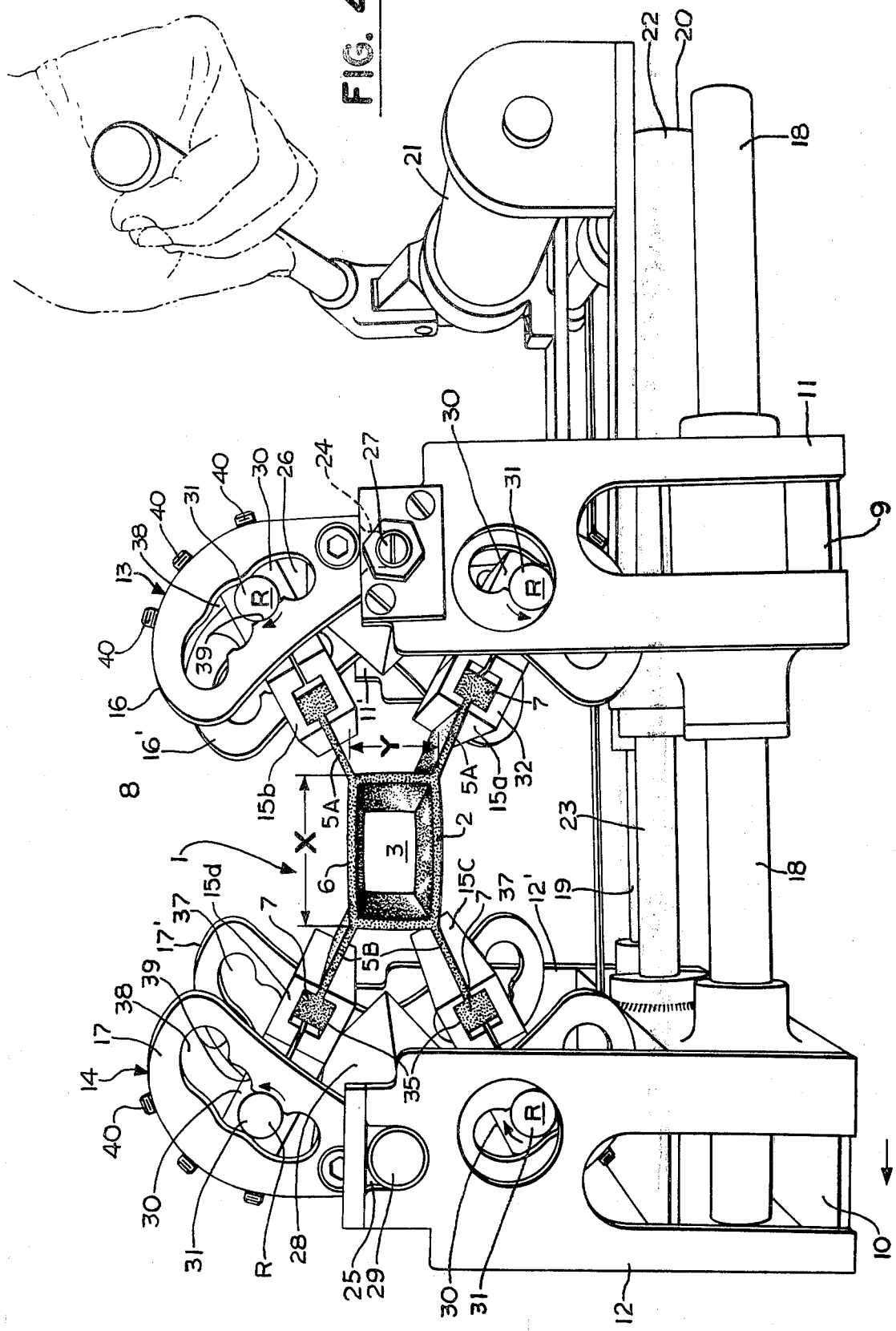

APPARATUS FOR STRETCHING A TUBULAR WORK PIECE

BACKGROUND OF THE INVENTION

This invention relates to an apparatus for stretching a flexible resilient tubular work piece in at least two non-parallel directions. More specifically, this invention relates to a device for expanding a cylindrical tube of stretchable elastomeric material in such a manner that the opening of the tube is extended substantially in both a vertical and a horizontal direction to conveniently accommodate elongated elements which are inserted into and through the tube. This invention is particularly directed to an expanding device used to apply covers to spliced or repaired areas of electrical cables, for example, in underground mining operations.

Various general approaches have been employed for providing a cover for an elongated element such as a spliced or repaired section of electrical cable. In one such approach, the cover is a hollow tube of highly expandable or stretchable elastomeric material which includes gripping means such as continuous longitudinal ribs provided on its outer surface so that the tube may be expanded by outwardly directed forces acting on the ribs. This type cover and its method of application are disclosed and claimed in U.S. Pat. No. 3,770,876 to Herman B Post granted on Nov. 6, 1973. The teachings of this patent are incorporated by reference herein.

In the application of this type splice cover which is expanded by an external force, a suitable expanding device is required. Although many such devices are possible, one important consideration is that the tube should be expanded for a substantial distance in at least two non-parallel directions in order that it may conveniently accommodate various shapes and sizes of cable. It is necessary, for example, that the tube be extended biaxially to such a degree that it may accommodate cables of both a generally elliptical cross-section in which the major axis is disposed horizontally of the cable and a circular cross-section in which the vertical and horizontal axes are equal (for the purposes of the present invention, "biaxial" means two non-parallel axes and "uniaxial" means one axis). Therefore, the most desirable tube opening, at least theoretically, is one in which the vertical axis of the tube opening is equal to the horizontal axis of the tube opening. In other words, the cross section of the tube after it is expanded is at least substantially square. This, of course, can be accomplished if an equal radial force is applied to each rib on the outer periphery of the tube and if there are four equally spaced ribs on the outer periphery of the tube so that a square opening is formed by the radial expansion or stretching of the tube, as is shown in FIG. 5 of U.S. Pat. No. 3,770,876.

The equipment necessary to achieve such an opening in which the force would be comprised of equal components applied radially in all directions is relatively costly and complicated. Therefore, it has been the practice heretofore to use expanding equipment which when used, results in a tube opening of a substantially rectangular cross-sectional configuration in which the horizontal axis is substantially greater than the vertical axis, as is shown in FIG. 6 of U.S. Pat. No. 3,770,876. In operating this type equipment it has been the practice to hold two adjacent ribs of the tube in a stationary or fixed position and to apply a horizontal force to the opposite two ribs, thereby extending the tube in only one direction. Devices have also been used in which the jaw or gripping member is disposed at an angle to the horizontal (for example 45°) which does result in a somewhat increased extension in the direction of the vertical axis but heretofore no device has achieved significant opening in both a horizontal and a vertical direction by stretching the tube in only one lateral or uniaxial direction.

The above-mentioned disadvantages have been overcome by the present invention as will be hereinafter described.

OBJECTS OF THE INVENTION

It is a primary object of this invention to provide an apparatus for stretching a flexible resilient tubular work piece for a substantial distance in at least two non-parallel directions to achieve a substantial opening in each non-parallel direction.

It is another object of the present invention to provide a device for biaxially expanding a cylindrical tube of stretchable elastomeric material with parts of the device movable in only one uniaxial direction but with a substantial opening of the tube being achieved in both the vertical and horizontal directions.

It is still another object of the present invention to provide a device for applying a protective cover over the spliced or repaired area of an electrical cable with the cover being capable of accommodating cables of various cross-sectional shapes and dimensions.

Other objects and advantages of this invention will become apparent hereinafter as the description thereof proceeds, the novel features, arrangements and combinations being clearly pointed out in the specification as well as the claims thereunto appended.

In accordance with the present invention, it has been discovered that the above objects and advantages are accomplished by the use of an apparatus for stretching a flexible resilient tubular work piece in at least two non-parallel directions with the apparatus comprising: (A) a first frame member; (B) a second frame member spaced from said first frame member; (C) means mounting said frame members for relative movement of at least one frame member toward and away from the other frame member; and (D) pivotably movable means carried on at least one frame member for gripping the work piece at spaced gripping locations on the periphery of the external surface thereof so that when the frame members move in one axial direction in relation to each other, the work piece is stretched in two non-parallel directions.

BRIEF DESCRIPTION OF THE DRAWINGS

FIG. 4 is a view similar to FIG. 3 but showing the tube in a fully expanded condition.

DESCRIPTION OF THE PREFERRED EMBODIMENT

Figures 1, 2:
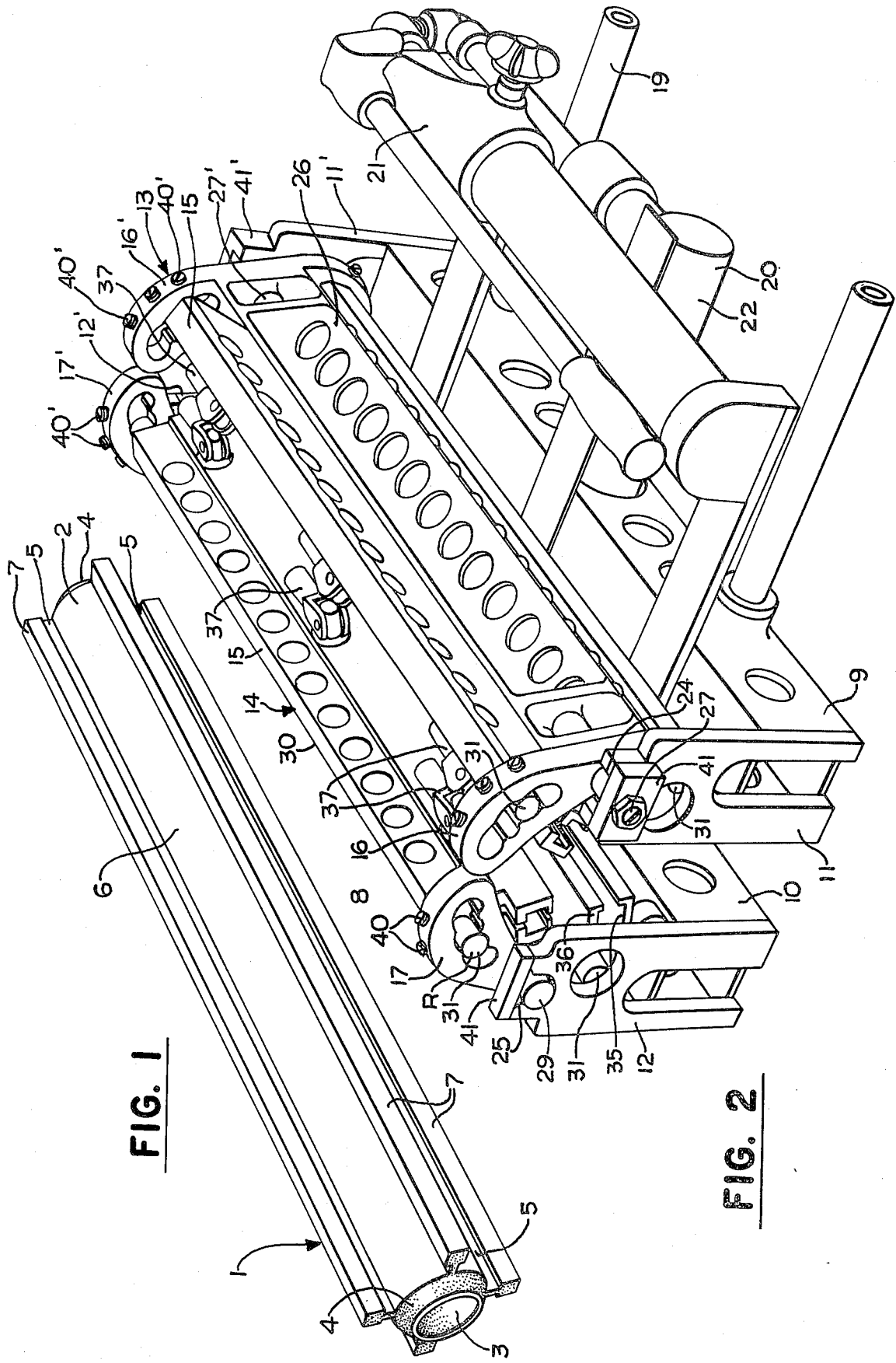
FIG. 1 is a perspective view of the tubular elastic cover or tube which may be stretched or expanded by the apparatus of the invention.
FIG. 2 is a perspective view of the apparatus of the present invention prior to the installation of the tube in the apparatus.

In FIG. 1 the elastic sleeve or cover of the type described in U.S. Pat. No. 3,770,876 which is particularly adapted to be expanded by the apparatus of the present invention is shown in its unexpanded condition. The cover 1 is adapted for disposition over at least one supporting member or work piece, such as an elongated electrical cable, and includes a hollow tube 2 of highly expandable or stretchable elastomeric material which may be greatly expanded outwardly. The tube 2, as shown, is of a generally elongated cylindrical shape and contains a central bore or opening 3 extending its entire length. The tube may be of various dimensions depending upon the particular supporting member or work piece which it is to cover. The tube preferably includes beveled portions 4 at each end to provide for substantially unobstructed movement when the member with the cover in position therearound is moved. The tube 2 may also be of other configurations if desired and need not be of a circular cross-sectional configuration only. For instance, the tube may be a straight-sided or a combination of curved and straight-sided shapes such as rectangular or of other well-known geometric configurations.

The tube 2 in its unexpanded condition is incapable of being positioned over the member. In other words, the perimeter of the opening 3 of the unexpanded tube 2 is less than the perimeter of the outer cross section of the supporting member over which it will be disposed. The tube 2 may have an inner perimeter of about 25 percent less than the perimeter or circumference of the outer cross section of the member. Typically, the tube may be about 12 to 16 inches long with a wall thickness of about one-eighth of an inch and an inside diameter of about seven-eighths of an inch.

Gripping means such as a plurality of removable lugs or ribs 5 of elastomeric material are integrally formed on the outer peripheral surface 6 of the tube 2 and extend longitudinally thereof. The ribs 5 project outwardly from the outer peripheral surface 6 of the tube 2 so that the tube can be expanded by the expanding apparatus of the present invention, as will be hereinafter described. Any number of ribs may be provided with the exact number depending upon the particular application. In most instances, at least three ribs should be provided to achieve adequate expansion of the tube. After the cover 1 is applied over the work piece, the ribs 5 may be easily removed by an ordinary rubber mill knife or the like.

The ribs 5 may be of a uniform rectangular cross-sectional configuration having a width on the order of about one-eighth of an inch and a thickness or height of about one-half of an inch and are preferably disposed on the outer circumference of the tube 1 at equally spaced distances apart. For example, as illustrated in FIG. 1, four ribs 5 may be disposed at 90° intervals around the circumference of the outer peripheral surface 6 of the tube 2 to provide spaced gripping locations. The ribs preferably include an enlarged portion 7, for instance, at the outermost ends thereof for gripping by an expanding means such as the apparatus of the present invention. The enlarged portion 7, for example, may be of a rectangular cross-sectional configuration having a width of about one-fourth of an inch and a thickness of about one-fourth of an inch. The enlarged portion of the ribs may be of a polygonal cross-sectional configuration or of a curvilinear cross-sectional configuration. Alternately, holes may be provided transversely through the ribs and the expanding device may be attached to the ribs by means of the holes.

The apparatus or expanding device 8 of the invention is shown in FIGS. 2–5. FIG. 2 shows the apparatus prior to the installation or mounting of a tubular work piece such as the tube 2 of FIG. 1. Generally, the apparatus 8 comprises an assembly of parts including spaced frame members 9 and 10, supporting members 11, 11' and 12, 12' at each end of the frame members and gripping assemblies 13 and 14 supported for pivotable movement on the members 11, 11' and 12, 12' respectively. The gripping assemblies include a plurality of gripping jaw members 15 supported or suspended between two pairs of spaced-apart rigid yokes 16, 16' and 17, 17'. The yokes are carried by the support members 11, 11' and 12, 12' respectively.

Each frame member 9 and 10 is an elongated metal plate mounted on hardened steel guide rods 18 and 19. The frame members are mounted for relative movement of at least one of the frame members toward and away from the other frame member. In this instance, frame member 9 is fixed or stationary and frame member 10 is movable being adapted for movement in the uniaxial direction toward and away from the fixed frame member 9, for example, in a horizontal plane. A hydraulic cylinder 20 actuates the movement of the movable frame member 10 by means of an actuating pump 21. The cylinder 20 includes a body 22 attached to the frame member 9 and a rod 23 attached to the frame member 10. Of course, it is to be understood that other actuating means may be used such as pneumatic means, mechanical means or electrical means. An example of such mechanical actuating means is a sprocket and chain arrangement.

It will be recognized that with only small modifications, the frame member 9 may be made movable and the frame member 10 may be stationary. Additionally, in an alternate structure (not shown) both frame members may be movable with respect to the guide rods and the guide rods may be secured to a separate base or frame.

In the embodiment illustrated, the supporting members 11 and 11' are rigidly fixed or attached in upright position to the opposite ends of the fixed frame member 9 and the supporting members 12 and 12' are rigidly fixed in an upright position to opposite ends of the movable frame member 10. Each support 11, 11' and 12, 12' includes a slot or recess 24, 24' and 25, 25' respectively in its upper portion for supporting or carrying the rigid yokes 16, 16' and 17, 17' respectively.

The jaw assemblies 13 and 14 are similar and a description of one will suffice for both. The jaw assembly 13 includes a pair of rigid yokes 16 and 16' rigidly mounted on opposite ends of a bar 26. A pair of coaxially arranged journals 27, 27' extend one each outwardly from the yokes 16 and 16' and are received in the recesses 24 and 24' in the supports 11 and 11' respectively and thus support the yokes for unitary pivotal movement about the common axis of the journals.

It may be preferred that the yokes be generally arcuate to facilitate spacing of the gripping jaw members 15.

The jaw assembly 14 is substantially identical to jaw assembly 13 but is mounted on supports 12 and 12' so as to be in spaced confronting relationship to assembly 13 with the bar 28 being generally parallel to the bar 26 and the coaxially arranged journals 29 and 29' being received in recesses 25 and 25' respectively.

Pivotably movable means such as the pivotably movable jaw members 15 for gripping adjacent spaced longitudinally extending ribs 5 on the external periphery 6 of the tube 2 of FIG. 1 are supported by at least one of the frame members 9 or 10. Preferably, the pivotably movable jaw members 15 are hingedly attached to at least one of the support members 11, 11' or 12, 12' for ease of installation of the cover 1 in the apparatus as is shown in FIG. 3.

Figure 3:
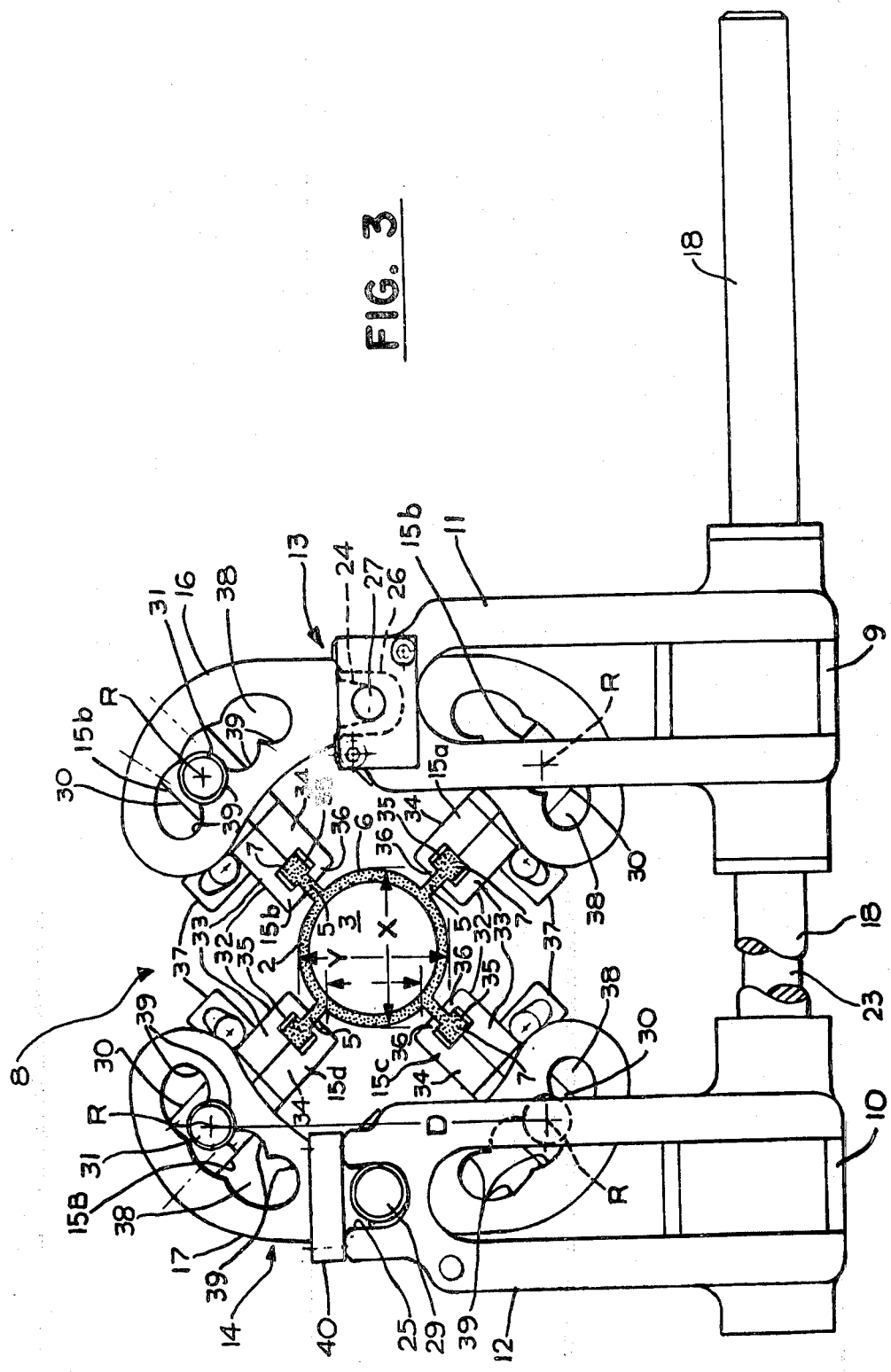
FIG. 3 is an end plan view of the apparatus of the present invention showing the tube installed in the apparatus in an unexpanded condition.
Figure 3A:
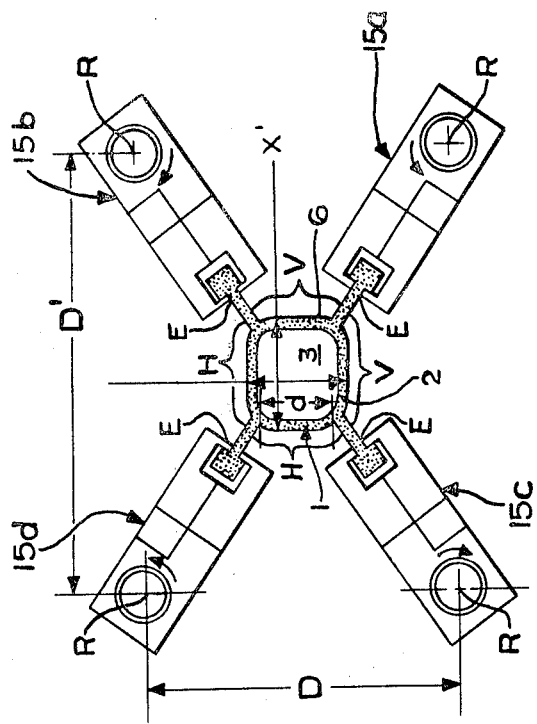
FIGS. 3A, 3B, 3C, 3D and 3E are end views of the apparatus with parts removed to more clearly show the operation of the invention in which the tube is progressively expanded.
Figure 3B:
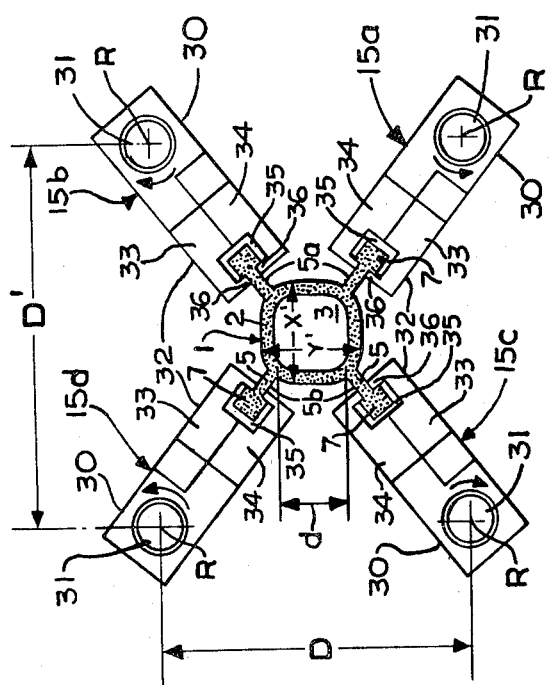
Figure 3D:
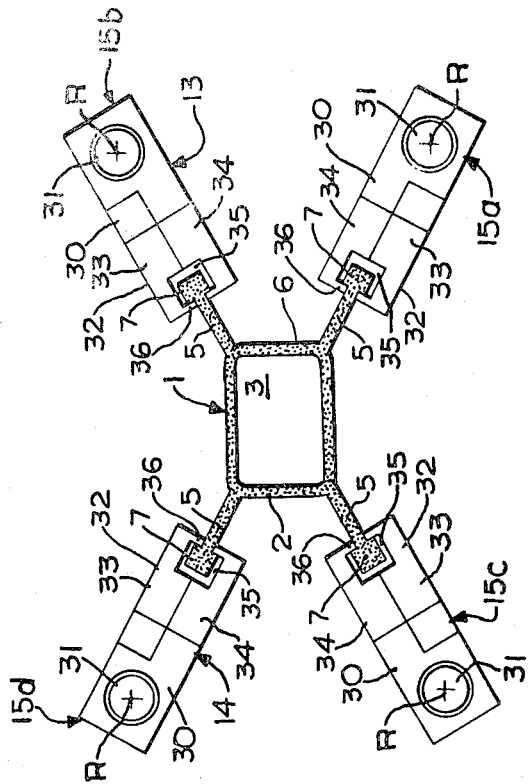
Figure 3C:
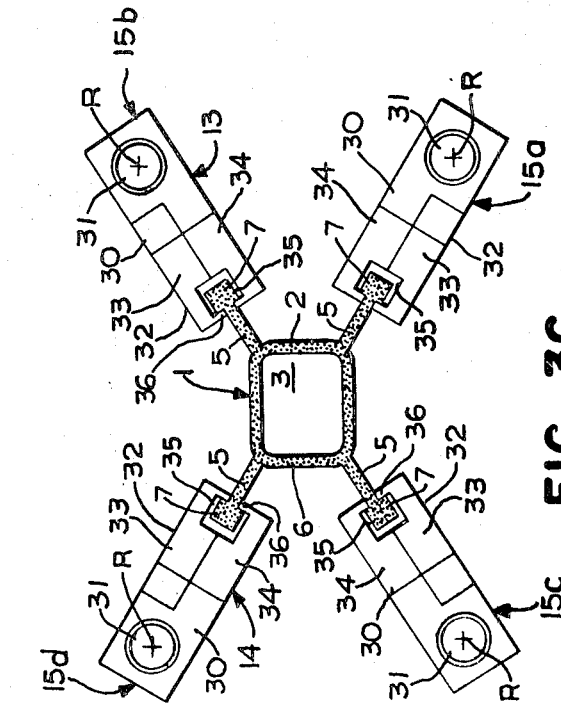
Figure 3E:
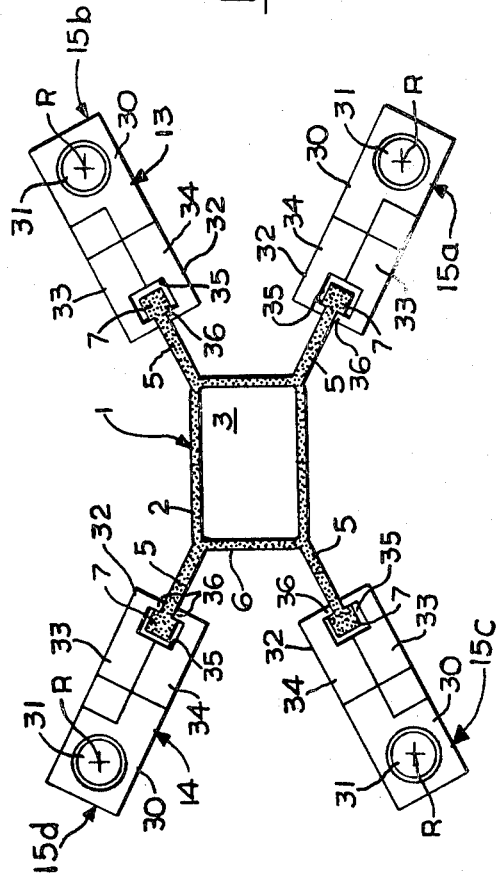

The gripping jaw members 15, as illustrated particularly in FIG. 3, are two pairs of elongated rigid members which will be identified by numerals and suffixes 15a, b and 15c, d with each pair supported between the pair of yokes 16, 16' and 17, 17' respectively. The jaw members are in the form of spaced swingable arms, each having an axis of rotation R. Two arms 15a and 15b are carried or supported on one of the frame members 9 and two spaced swingable arms 15c and 15d are carried or supported on the other frame member 10. All the jaw members are similar and a description of one will suffice as a description of all. For example, the jaw member 15a includes an elongated jaw base 30 in the form of a metal bar or plate extending between and pivotably mounted to each pair of yokes 16 and 16' by means of spaced apart coaxial journals 31, 31' disposed at each opposite end of the jaw member 15a. The journals are seated in arcuate bearing surfaces contained in the yokes and by virtue of the rotation of the journal in the bearing surface the jaw member 15a is free to pivot through a maximum angle or arc of about 45°.

The jaw member 15a also includes a jaw gripping portion 32 associated with the base portion 30 extending substantially the entire length thereof for gripping the ribs 5 of the tube 2. As best shown in FIGS. 3 and 3A through 3E, the jaw gripping portion 32 is comprised of two elongated sections 33 and 34 disposed in confronting relation to each other with a cavity 35 thereby formed for receiving the enlarged portion 7 of the ribs 5. The cavity 35 therefore should have the same general configuration as the portion 7 of the ribs 5. The ends of the confronting sections 33 and 34 of the gripping portion 32 of the jaw member 15a each preferably includes a lip 36. The lips 36 on each confronting section 33 and 34 protrude toward each other to enable the lips to firmly engage the work piece such as the ribs 5 of the tube 2. It is to be understood that the jaw members including the gripping portions, can be of other shapes and configurations depending upon the particular shape and configuration of the work piece being gripped. For example, the gripping portion could be serrated for gripping a straight sided rib having no enlarged portion.

The jaw base 30 and gripping portion 32 may be connected together by any suitable means in the art well known for this purpose. The jaw member 15a may, for example, include means such as a plurality of camactuated clamps 37 positioned at equally spaced intervals along the exterior of the length of the jaw member for locking the jaw sections 33 and 34 together in place after the tube 2 is mounted in position and for releasing the jaw sections to allow the tube to be removed after the splice procedure is completed (and, for example, the splice cover 1 is positioned around the cable). Of course, other clamping or locking means may be used for this purpose such as set screws or the like.

It is apparent that the other jaw members 15b, 15c and 15d are substantially identical to jaw member 15a in both structure and function.

It is preferred that in order for the apparatus 8 of the invention to accommodate a greater range of tube sizes that the apparatus includes means for changing the distance between the axis of rotation R of the respective arms or jaw members 15 supported on each frame member 9 and 10. For example, each yoke 16, 16' and 17, 17' may include means for adjusting the position of each jaw member 15 by changing the distance of the axis R of each jaw base portion 30 on the yoke. For this purpose, openings or voids 38, 38' are provided in the opposite ends of each yoke 16, 16' and 17, 17' extending transversely thereof including a plurality of arcuate seating slots 39, 39' to provide bearing surfaces for receiving the journals 31, 31' of the jaw members 15 therein. Means such as spring loaded plungers 40, 40' or the like may be used to hold each journal 31, 31' in place in the respective seating slot 39, 39'. In order to accommodate tubes having a greater inside diameter, it is then merely necessary to release the plunger 40, 40' and change the position of the journals 31, 31' in the slots 39, 39' in each yoke 16, 16' and 17, 17'.

The apparatus of the invention may be manufactured from any suitable metal such as steel or cast iron but if the expanding device is intended to be portable as many of the component parts as possible should be formed from aluminum to reduce its weight. In this regard it is also preferable that the metal parts such as the frame plate members 9 and 10, bars 26 and 28 and the jaw base portions 30 be perforated to further reduce the weight of the apparatus. For example, a complete portable type unit made primarily of aluminum may weigh in the neighborhood of 25 to 30 pounds.

In order to mount the tube 2 in the jaw assembly 14, the clamps 37 are released and one pair of adjacent ribs 5a of the tube 2 are inserted into the receiving cavity 35 of the jaw gripping portion 32 of the jaws 15a and 15b which are carried by the movable frame member 10. The jaw assembly 14 is not removable since it is mounted in position and restricted by means of keeper blocks 41 and 41' which rest on the top of the supports 12 and 12' respectively and are connected thereto by any suitable means well known in the art.

The other jaw assembly 13 in this instance is hingedly or removably attached to the fixed frame member 9 and is removed from the apparatus 8 by being lifted out of the recesses 24 and 24' in the supports 11 and 11'. The clamps 37 on the exterior of the jaw members 15 are released and the opposite pair of radially spaced continuous ribs 5b on the tube 2 are then inserted or fitted into the receiving cavities 35 formed in the jaw gripping portions 32 of the jaw members 15b and 15c. The receiving cavities 35 have a configuration corresponding at least substantially to the configuration of the enlarged portions 7 of the ribs 5. The removable jaw assembly 13 is then again positioned in place on the apparatus by inserting the journal ends 27 and 27' of the bar 26 into the recesses 24 and 24' in the supports 11 and 11'. The clamps 37 are then set in the closed position to securely mount the tube 2 in the jaw members 15 with the lips 36 and the jaw gripping portions 32 engaging the ribs 5 of the tube at points E with the portions 7 of the ribs being disposed within the jaw receiving cavities 35.

With reference to FIGS. 3A through 3E in the operation of the device, after the tube 2 is mounted in the apparatus 8, the frame 10 is moved away from the frame 9 in a horizontal direction by the action of the hydraulic cylinder 20.

The vertical distance D between the axes R of each jaw assembly 13, 14 remains the same while the horizontal distance D' between the axes R increases as the frames are separated. The movement in the horizontal direction is resisted at first by the horizontal quadrants H of the tube 2 and as the distance D' increases these horizontal quadrants are stretched. The force exerted back on the jaw members 15 by the tension in these horizontal quadrants H has the effect of rotating the jaw members in the direction of the arrows about the respective axes of rotation as shown in FIGS. 3A through 3E. In order to so rotate the vertical quadrants V also must be stretched. Therefore, as the distance D' increases, the tension in the horizontal quadrants H increases and urges the jaws to pivot as indicated by the arrows and stretch or elongate the vertical quadrants V. Thus it can be seen that by utilizing simple horizontal movement of the one frame member in one direction, a biaxial stretch is effected on the tube.

The tube in its fully extended condition as mounted in the apparatus or expanding device is shown in FIG. 4.

Figure 5:
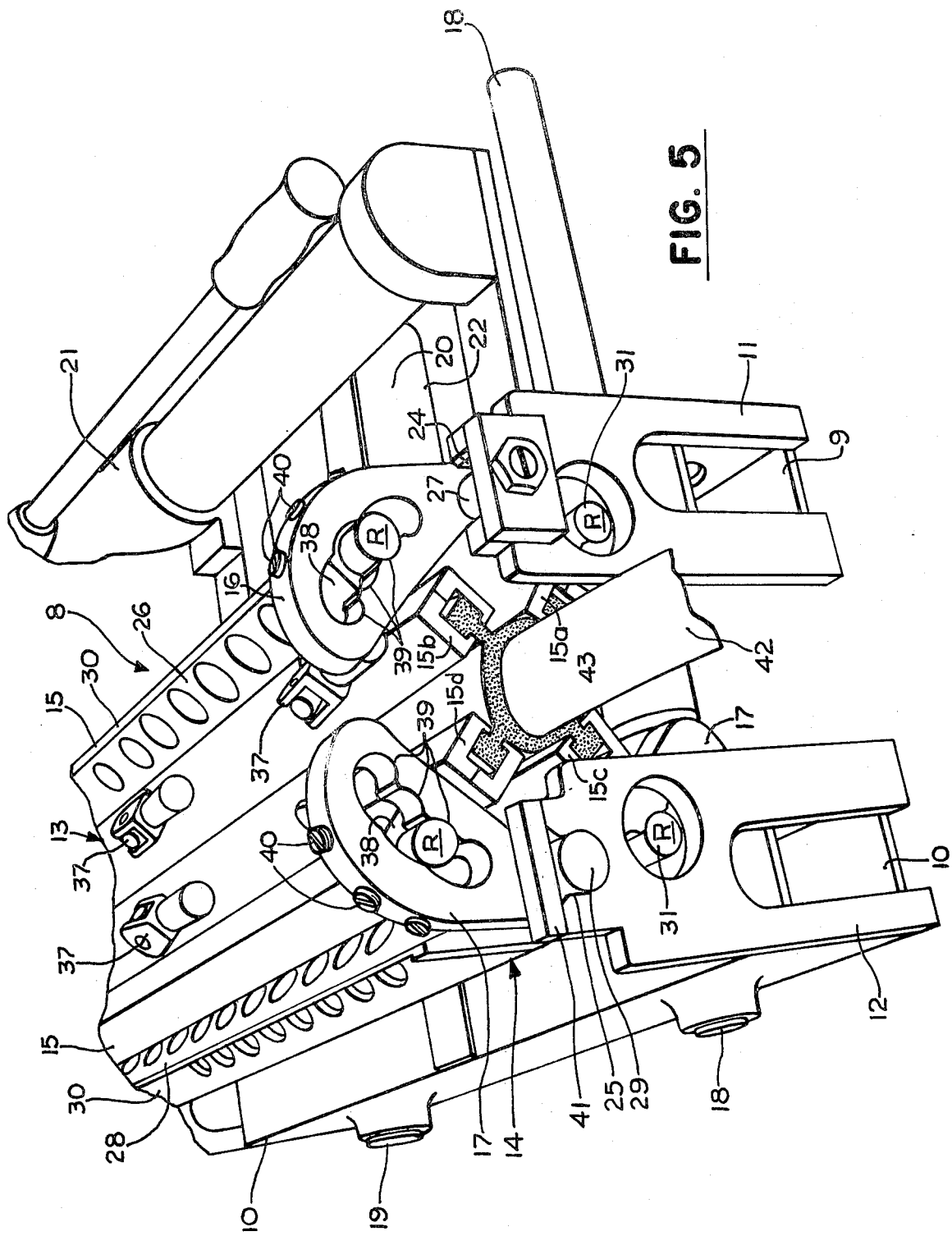
FIG. 5 is a perspective view of the apparatus of the invention with parts removed showing the preferred use of the invention.

After the desired extension of the tube 2 has been accomplished, an electrical cable 42 is inserted through the bore 3 of the tube 2 and a suitable splice 43 is made by any of the well known splice procedures. The spliced cable 42 is then inserted into the tube length so that the splice area 43 is centered in regard to the tube ends. It is preferred that a suitable adhesive be applied to cover the periphery of the spliced area 43 and/or the inside of the tube 2 to insure an adequate seal between the cover 1 and the cable 42. At this point the holding force is released by releasing the hydraulic pump 21 and the tube 2 attempts to return to its original circular cross-sectional configuration causing the frame members 9 and 10 to move toward each other until stopped by the dimensions of the splice area 43 of the cable 42. This arrangement of expanding device 8, cover 1 and encapsulated cable 42 is shown in FIG. 5. Finally, the jaw assembly 13, cover 1 and spliced cable 42 are removed from the frame 10. The jaw clamps 37 are released and the covered splice assembly is removed from the jaw members 15 for the purpose of trimming off the ribs 5 if desired and any further processing.

As illustrated in FIG. 3, the tube 2 is mounted in an unexpanded condition in the apparatus 8. In order to achieve the desired stretching or expansion of the tube 2, the distance D between the axes of rotation or axes of pivotable mounting R on the pair of yokes 16, 16' and 17, 17' of the arms or jaw members 15a, b or 15c, d is greater than the distance d between the respective spaced gripping locations on the external surface of the work piece, i.e. ribs 5a or 5b of the tube 2 engaged by the jaw members 15. In addition, the length of each pivotable jaw member 15a, b or 15c, d measured from the axis of pivotable mounting R to the point of engagement E with the ribs 5a or 5b of the tube 2 is greater than the outside diameter of the tube 2.

FIGS. 3A through 3E illustrate the stretching of the tube 2 for various lateral movements of the frame members 9 and 10. The opening or bore 3 of the tube when mounted in the jaw assemblies 13 and 14 in an unexpanded condition has equal dimensions in the horizontal X and vertical Y directions. As the jaw members 15c and 15d move away from the jaw members 15a and 15b the bore 3 of the elastic tube 2 stretches to a distance X' and the jaws being free to pivot on the journals 31 swing from a maximum angle of about 45° to an angle of about 15° thereby increasing the vertical dimensions from point Y to point Y'. The specific angle or arc through which the jaw members will pivot will depend upon the stretch applied to the tube. In this instance, depending upon the tube wall dimension and the resolution of forces, a tube can be designed to give approximately equal stretch in the X and Y direction or any proportion in the Y direction in regard to X.

The following table illustrates this principle using the tubes shown in FIGS. 3 and 3A through 3E having, for example, an inner diameter of 0.680 of an inch and a wall thickness of 0.112 of an inch with the various separation distances indicated.

| FIG. | Original Dimensions | X | Y | Jaw Angle |
| --- | --- | --- | --- | --- |
| 3 | 0 inches separation | .680 | .680 | 45 degrees, 0 min |
| 3A | ½ inch separation | .720 | .720 | 37 degrees, 30 min |
| 3B | 1 inch separation | .800 | .770 | 34 degrees, 30 min |
| 3C | 1½ inches separation | 1.000 | .800 | 32 degrees, 0 min |
| 3D | 2 inch separation | 1.200 | .850 | 29 degrees, 0 min |
| 3E | 2½ inch separation | 1.450 | .960 | 27 degrees, 0 min |

From the foregoing, it should be apparent to those skilled in the art that the expanding apparatus of the present invention will accomplish the objects and advantages of the invention as set forth previously in this application.

In addition, it should be apparent to those having skill in the art that the apparatus as described herein may be used to expand or stretch a variety of elastic tubular work pieces in addition to the tubular splice cover illustrated.

While certain representative embodiments and details have been shown for the purpose of illustrating the invention, it will be apparent to those skilled in art that various changes and modifications may be made therein without departing from the spirit or scope of the invention.

What is claimed is:

1. An apparatus for stretching a flexible resilient tubular work piece in at least two nonparallel directions perpendicular to the longitudinal axis of said work piece, said apparatus comprising:
   A. a first frame member;
   B. a second frame member spaced from said first frame member;
   C. means mounting said frame members for relative movement of at least one said frame member toward and away from the other said frame member; and
   D. a pair of spaced pivotably movable gripping means carried on at least one said frame member and gripping means carried on the other said frame member with each said gripping means having a gripping portion for gripping the work piece at spaced gripping locations on the periphery of the external surface thereof, the pair of pivotably movable gripping means being pivotable about a pair of spaced axes of rotation so that when said frame members move in one axial direction away from each other the pivotably movable means is free to pivot and the work piece is stretched in two nonparallel directions perpendicular to the longitudinal axis of said work piece.

2. The apparatus as claimed in claim 1 wherein said pivotably movable means includes at least two spaced swingable arms each having a separate axis of rotation and being supported on one said frame member and at least two spaced swingable arms each having a separate axis of rotation and being supported on the other said frame member.

3. The apparatus as claimed in claim 2 wherein the length of each said arm measured from the axis of rotation to the end of the arm is greater than the cross-sectional dimension of the work piece.

4. The apparatus as claimed in claim 2 further including means for changing the distance between the axes of rotation of the respective arms supported on each said frame member.

5. The apparatus as claimed in claim 2 wherein the distance between the axes of the arms supported on each respective frame member is greater than the distance between the respective spaced gripping locations on the external surface of the work piece when the work piece is in an unstretched condition.

6. A device for biaxially expanding a cylindrical tube of stretchable elastomeric material, said device comprising:
   A. a fixed elongated frame member;
   B. a movable elongated frame member spaced from and generally parallel to said fixed frame member and adapted for movement in a uniaxial direction toward and away from said fixed frame member;
   C. means actuating the movement of said movable frame member relative to said fixed frame member; and
   D. means on each said frame member including pivotably movable jaw members supported on at least one said frame member for gripping adjacent spaced longitudinally extending ribs on the external periphery of the tube when said movable frame member is moved in a uniaxial direction toward said fixed frame member and for expanding the tube biaxially in two mutually perpendicular directions when said movable frame member is moved in a uniaxial direction away from said fixed frame member.

7. The device as claimed in claim 6 further comprising a first pair of upright support members attached to opposite ends of said fixed frame member and a second pair of upright support members attached to opposite ends of said movable frame member with said means for gripping and expanding the tube being hingedly attached to at least one of said support members.

8. The device as claimed in claim 7 further comprising two pairs of spaced apart rigid yokes, one of which pairs is supported by said first pair of support members and the other of which pairs is supported by said second pair of support members, two elongated jaw members including an elongated jaw base extending between and pivotably mounted to each said pair of yokes, and a jaw gripping portion associated with said base portion extending substantially the entire length thereof for gripping the ribs of the tube.

9. The device as claimed in claim 8 wherein when the tube is in an unexpanded condition, the length of each pivotable jaw member measured from the axis of pivotable mounting to the point of engagement with the ribs of the tube is greater than the outside diameter of the tube and the distance between the axis of pivotable movement of each jaw member on said pair of yokes is greater than the distance between the adjacent ribs of the tube engaged by said jaw member.

10. The device as claimed in claim 8 wherein each said yoke includes means for adjusting the position of said jaw member by changing the distance between the axis of pivotable mounting of the jaw base portion on the yoke.

11. The device as claimed in claim 10 wherein each said jaw base further includes spaced apart coaxial journals at each opposite end thereof and said means for adjusting the position of said jaws is an opening extending transversely of each said yoke including a plurality of arcuate seating slots therein for receiving the journals therein.

* * * * *